US012740570B1

(12) United States Patent
McFarland et al.

(10) Patent No.: US 12,740,570 B1
(45) Date of Patent: Sep. 22, 2026

(54) METHOD OF CONTROLLING BIOLUMINESCENCE IN RED TIDE ALGAE

(71) Applicant: University of South Florida, Tampa, FL (US)

(72) Inventors: Aidan McFarland, Plant City, FL (US); Libin Ye, Lutz, FL (US)

(73) Assignee: University of South Florida, Tampa, FL (US)

( * ) Notice: Subject to any disclaimer, the term of this patent is extended or adjusted under 35 U.S.C. 154(b) by 316 days.

(21) Appl. No.: 18/590,380

(22) Filed: Feb. 28, 2024

Related U.S. Application Data

(60) Provisional application No. 63/487,485, filed on Feb. 28, 2023.

(51) Int. Cl.
*A01N 63/60* (2020.01)
*A01N 63/50* (2020.01)
*A01P 13/00* (2006.01)

(52) U.S. Cl.
CPC ............ *A01N 63/60* (2020.01); *A01N 63/50* (2020.01); *A01P 13/00* (2021.08)

(58) Field of Classification Search
None
See application file for complete search history.

(56) References Cited

PUBLICATIONS

Chen et al., Am. J. Physiol. Regul. Integr. Comp. Physiol. 292: R2020-R2027 (2007).*

Chen, A.K., Latz, M.I., Sobolewski, P. & Frangos, J.A. Evidence for the role of G-proteins in flow stimulation of dinoflagellate bioluminescence. Am J Physiol Regul Integr Comp Physiol 292, R2020-2027 (2007).

Mojib, N. & Kubanek, J. Comparative transcriptomics supports the presence of G protein-coupled receptor-based signaling in unicellular marine eukaryotes. Limnology and Oceanography 65, 762-774 (2019).

Gao, Y. et al. Structures of the Rhodopsin-Transducin Complex: Insights into G-Protein Activation. Mol Cell 75, 781-790 e783 (2019).

De Mendoza, A., Sebe-Pedros, A. & Ruiz-Trillo, I. The evolution of the GPCR signaling system in eukaryotes: modularity, conservation, and the transition to metazoan multicellularity. Genome Biol Evol 6, 606-619 (2014).

Roy, S. & Morse, D. A full suite of histone and histone modifying genes are transcribed in the dinoflagellate Lingulodinium. PLoS One 7, e34340 (2012).

* cited by examiner

*Primary Examiner* — Erin M. Bowers
(74) *Attorney, Agent, or Firm* — Michele L. Lawson; Shumaker, Loop & Kendrick, LLP

(57) ABSTRACT

A novel method of reducing dinoflagellate algae blooms that cause red tide is disclosed. Aggregation of dinoflagellate algae, such as *Lingulodinium polyedra* (*L. polyedra*), can cause algae blooms contributing to "red tide". Bioluminescence emitting from these algae reduce copepod predation of the algae thus increasing the formation of large algae blooms. By inhibiting BIR1, bioluminescence is reduced thus leading to increased copepod predation and control of the algae bloom formation.

20 Claims, 8 Drawing Sheets

Specification includes a Sequence Listing.

Selected Candidates from Transcriptome Screening

| Candidate | tBLASTn Query | Transcript | Blastx Match Name | E-Value | Identity |
|---|---|---|---|---|---|
| RC1 | | GABP01055425.1 | Slc14a2 | 1E-60 | 51% |
| RC2 | | GABP01034828.1 | SVEP1 | 3E-40 | 28% |
| RC3 (BIR1) | | GABP01049308.1 | GCR1 | 3E-103 | 58% |
| RC4 | | GABP01026848.1 | GABA B receptor subunit 1 | 3E-27 | 27% |
| RC5 | | GABP01078507.1 | venus kinase receptor | 2E-20 | 24% |
| | | | | | |
| G alpha, #1 | AAA35896.1 | GABP01012151.1 | g protein alpha g(o) | 1E-41 | 58% |
| G alpha, #2 | AAA35896.1 | GABP01011725.1 | G-protein alpha subunit 1 | 7E-40 | 49% |
| G alpha, #3 | AAA35896.1 | GABP01099021.1 | ADP-ribosylation factor 2-A | 2E-84 | 100% |
| G alpha, #4 | AAA35896.1 | GABP01014668.1 | GPA1, alpha subunit | 2E-21 | 62% |
| G beta, #1 | AAA35922.1 | GABP01016580.1 | G protein subunit beta 1 | 5E-61 | 61% |
| G gamma, #1 | AAB70039.1 | GABP01016651.1 | GGL Domain (pfam00631)* | 1.84E-03 | N/A |
| | | | | | |
| Phospholipase C beta #1 | AAF86613.1 | GABP01039190.1 | PLC-delta | 3E-107 | 35% |
| Phospholipase C beta #2 | AAF86613.1 | GABP01069986.1 | PLC-delta | 2E-108 | 60% |
| IP3R #1 | NP_001365381.1 | GABP01068841.1 | itr-1 | 0 | 61% |
| IP3R #2 | NP_001365381.1 | GABP01004473.1 | Itpr1 | 2E-44 | 27% |
| IP3R #3 | NP_001365381.1 | GABP01045322.1 | IPTR1 | 2E-17 | 28% |

Fig. 2

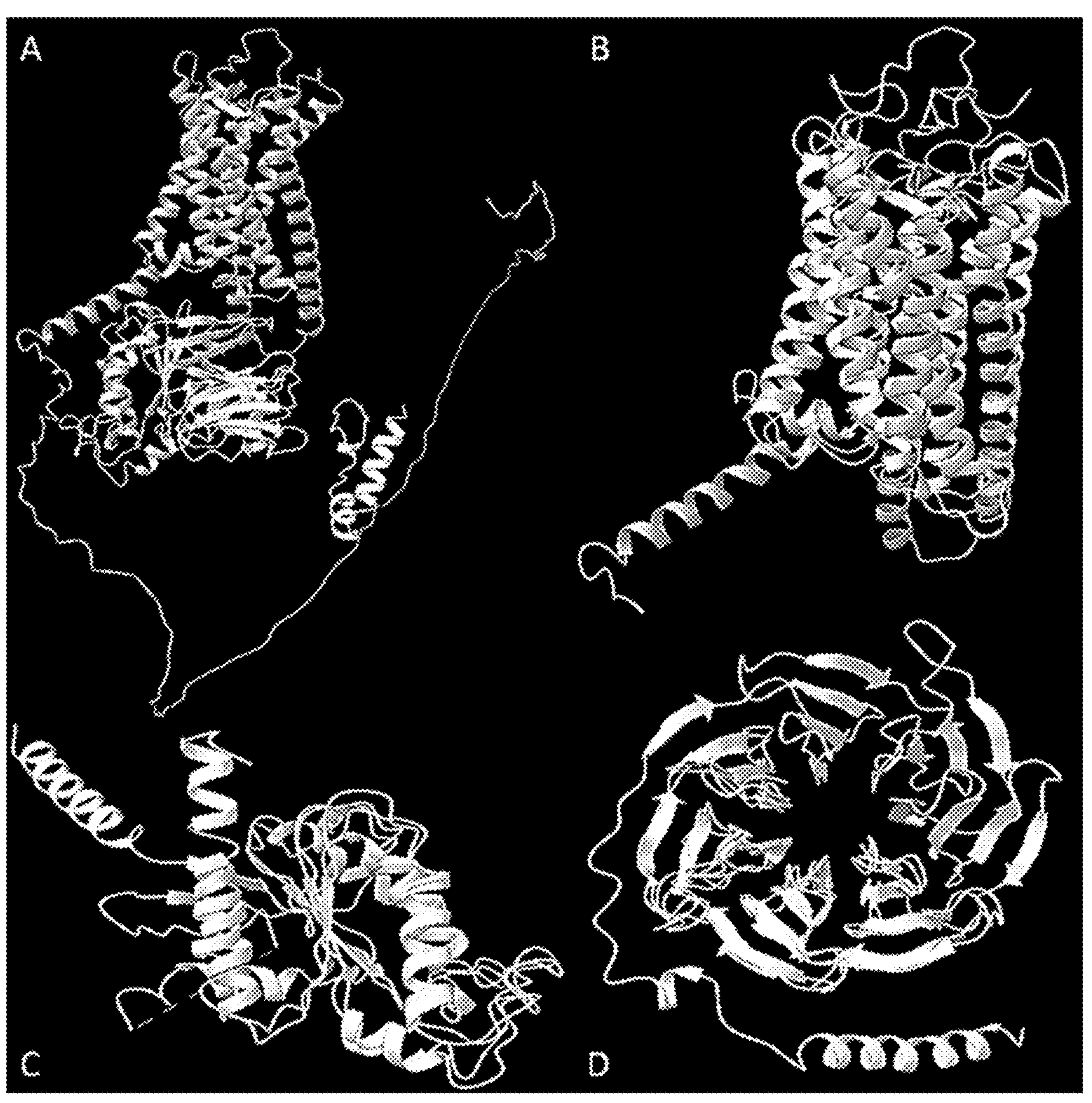
Fig. 3A-D

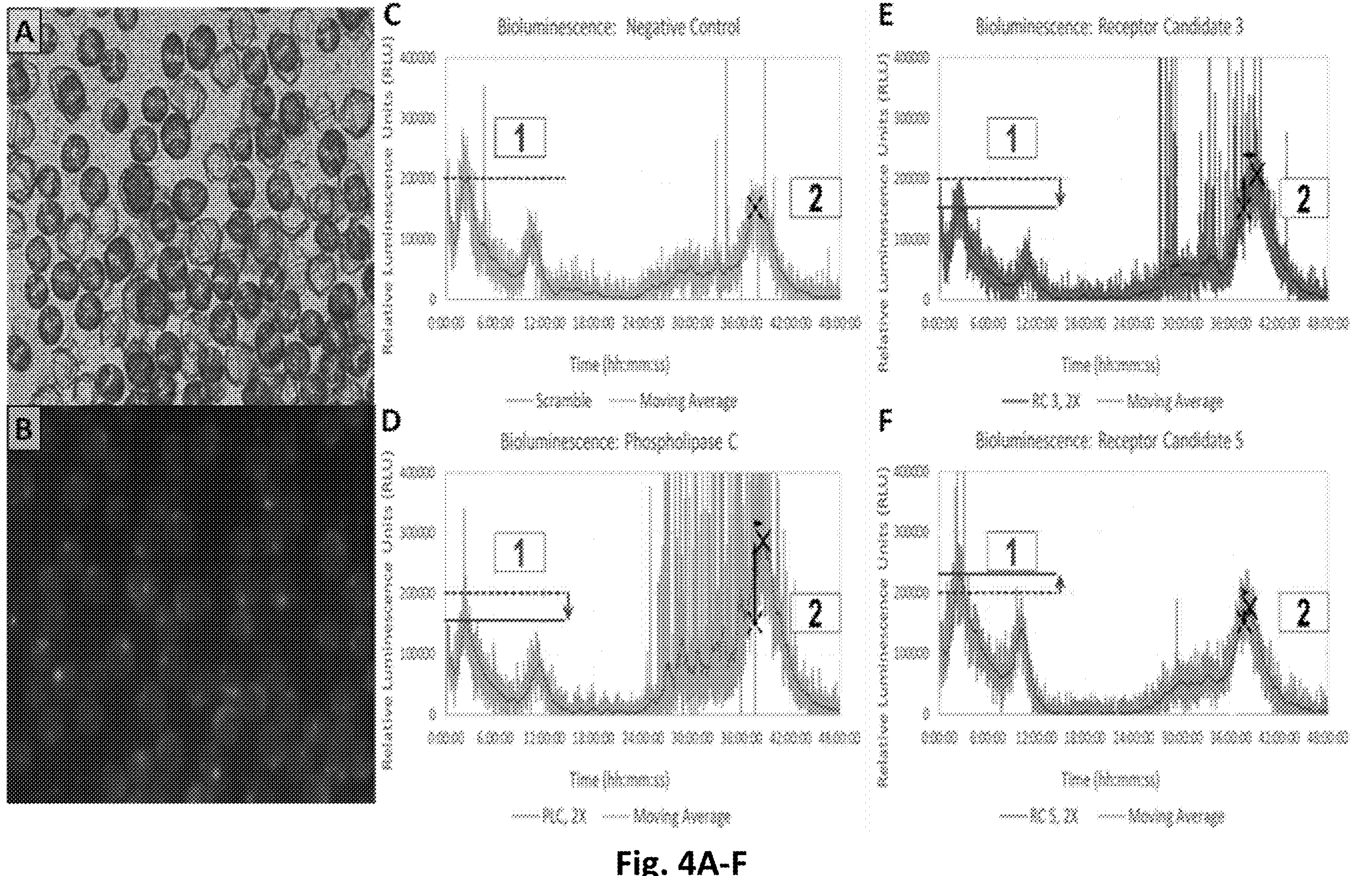
Fig. 4A-F

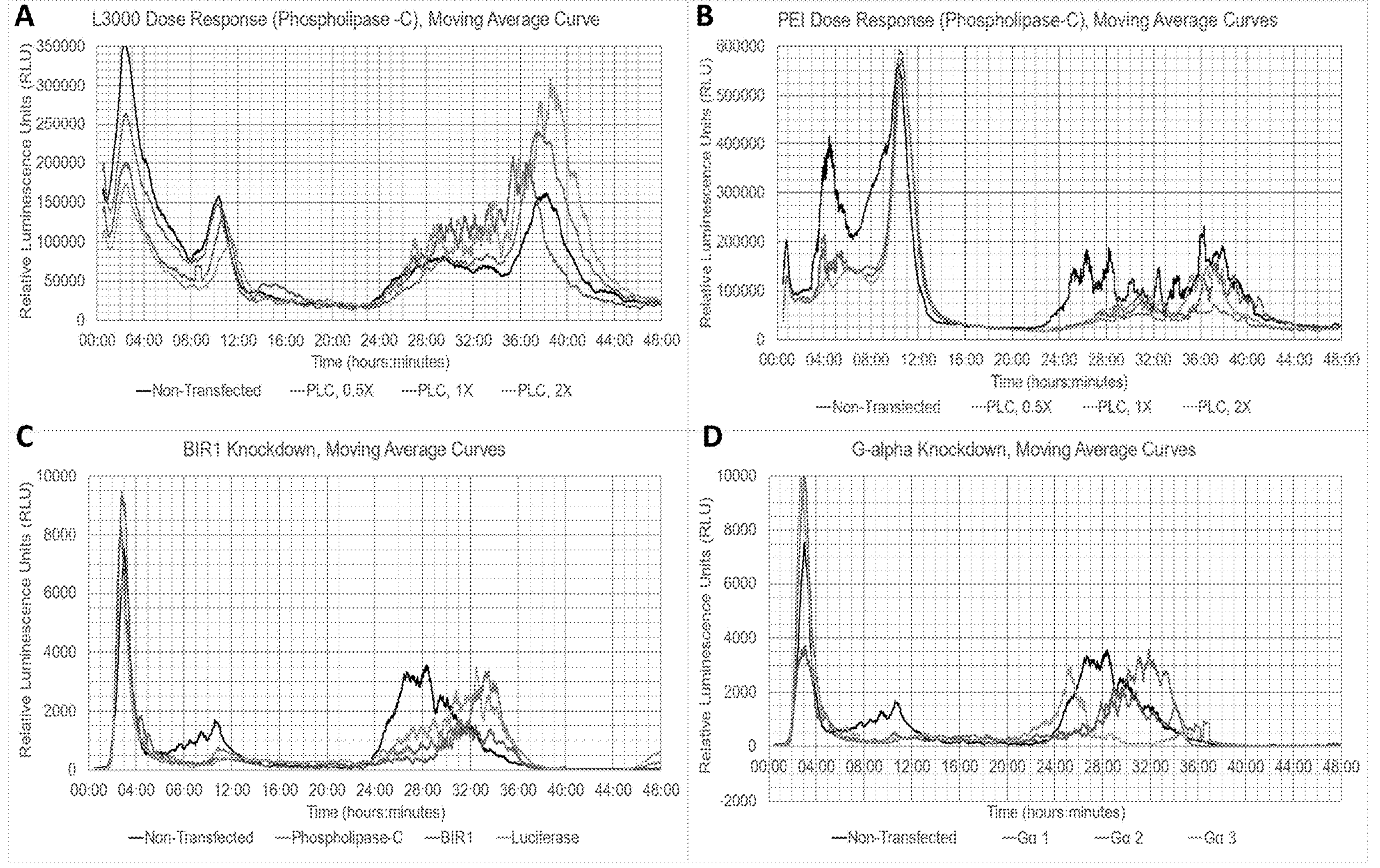
Fig. 5A-D

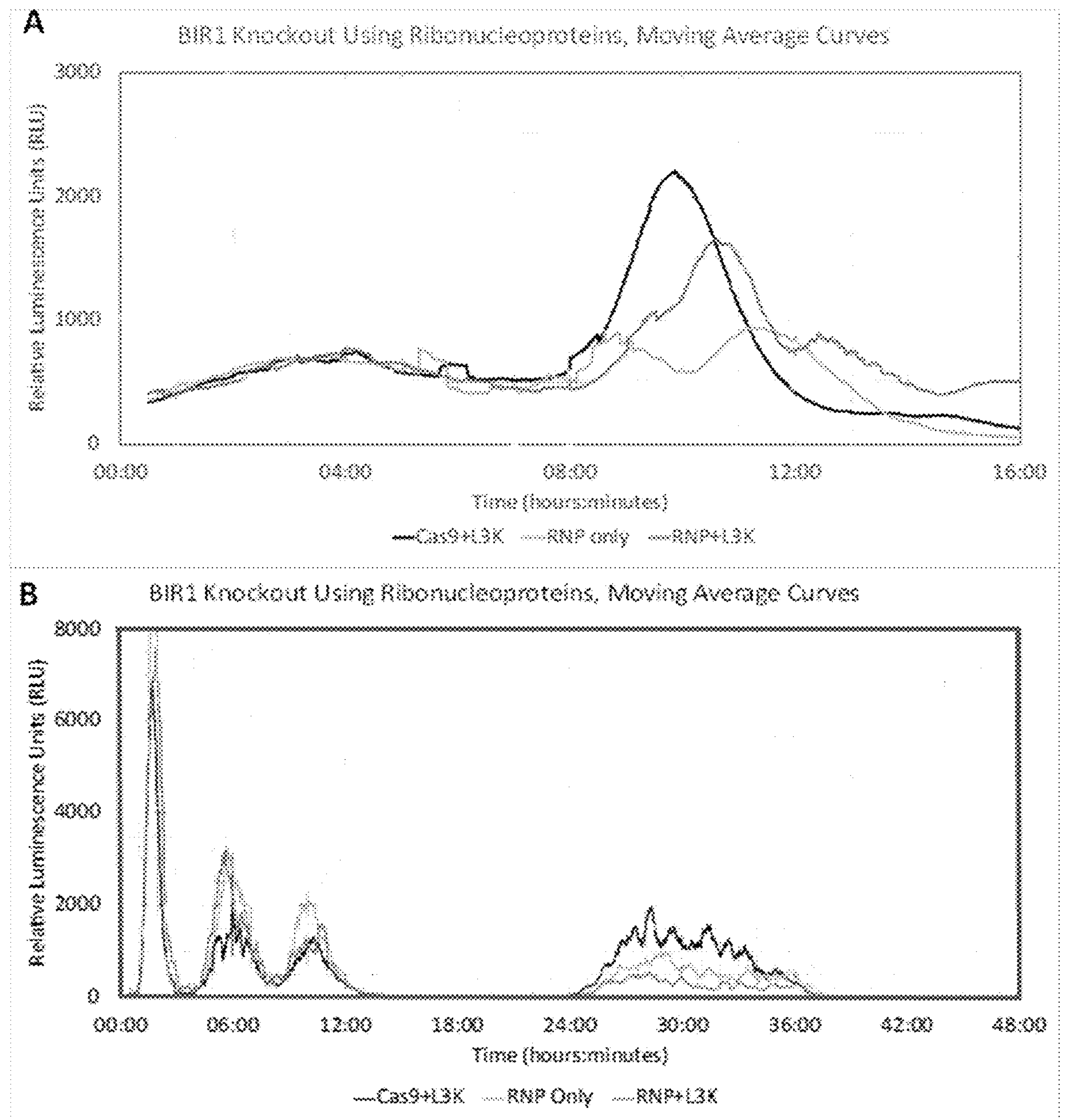
Fig. 6A-B

Antisense Oligonucleotides for Selected Candidates

| Target Name: Accession | Antisense Oligonucleotide |
|---|---|
| Scramble | CAGCCGTGCTGCAGCTGGTC (SEQ ID NO: 1) |
| Scramble 2 | GTTAGCATAGAACCTACACG (SEQ ID NO: 2) |
| RC 1: GABP01055425.1 | CCCGGGAGCGTCGTCCGCGA (SEQ ID NO: 3) |
| Mismatch 1 | CGCGGGAACGTCTTCGGCGA (SEQ ID NO: 4) |
| RC 2: GABP01034828.1 | CCATGAAGACGACCCCCATA (SEQ ID NO: 5) |
| Mismatch 2 | CCAGGAAGCCGGCCCTCATA (SEQ ID NO: 6) |
| RC 3: GABP01049308.1 | CCGTTGACCTGATGCTGCAC (SEQ ID NO: 7) |
| Mismatch 3 | CCGGTGAACTGATACTGCAG (SEQ ID NO: 8) |
| RC 4: GABP01034828.1* | CCGTGCAATGTAGTCATCGC (SEQ ID NO: 9) |
| Mismatch 4 | CGGTGCTATGTGGTCATCAC (SEQ ID NO: 10) |
| RC 5: GABP01026848.1 | CGGTTGTGCCTTGCAAACAG (SEQ ID NO: 11) |
| Mismatch 5 | CGGCTGTGCTTTGGAAGCAG (SEQ ID NO: 12) |
| PLC: GABP01069986.1 | CCTCGTACTTGATGCGCCCG (SEQ ID NO: 13) |
| Luciferase: EF156388.1 | CCCTTGAACGCATCCTCATC (SEQ ID NO: 14) |
| G Protein α 1: GABP01012151.1 | CTGCTTACAATTTAACTTTA (SEQ ID NO: 15) |
| G Protein α 2: GABP01011725.1 | CCTCCATCCGGTTCGTCTTG (SEQ ID NO: 16) |
| G Protein α 3: GABP01014668.1 | CCGGTCCCCCACTGCTCGCC (SEQ ID NO: 17) |

Fig. 8

SEQUENCE LISTING

```
Sequence total quantity: 17
SEQ ID NO: 1            moltype = DNA  length = 20
FEATURE                 Location/Qualifiers
source                  1..20
                        mol_type = other DNA
                        organism = synthetic construct
SEQUENCE: 1
cagccgtgct gcagctggtc                                              20

SEQ ID NO: 2            moltype = DNA  length = 20
FEATURE                 Location/Qualifiers
source                  1..20
                        mol_type = other DNA
                        organism = synthetic construct
SEQUENCE: 2
gttagcatag aacctacacg                                              20

SEQ ID NO: 3            moltype = DNA  length = 20
FEATURE                 Location/Qualifiers
source                  1..20
                        mol_type = genomic DNA
                        organism = Lingulodinium polyedrum
SEQUENCE: 3
cccgggagcg tcgtccgcga                                              20

SEQ ID NO: 4            moltype = DNA  length = 20
FEATURE                 Location/Qualifiers
source                  1..20
                        mol_type = other DNA
                        organism = synthetic construct
SEQUENCE: 4
cgcgggaacg tcttcggcga                                              20

SEQ ID NO: 5            moltype = DNA  length = 20
FEATURE                 Location/Qualifiers
source                  1..20
```

```
                         mol_type = genomic DNA
                         organism = Lingulodinium polyedrum
SEQUENCE: 5
ccatgaagac gacccccata                                          20

SEQ ID NO: 6             moltype = DNA  length = 20
FEATURE                  Location/Qualifiers
source                   1..20
                         mol_type = other DNA
                         organism = synthetic construct
SEQUENCE: 6
ccaggaagcc ggccctcata                                          20

SEQ ID NO: 7             moltype = DNA  length = 20
FEATURE                  Location/Qualifiers
source                   1..20
                         mol_type = genomic DNA
                         organism = Lingulodinium polyedrum
SEQUENCE: 7
ccgttgacct gatgctgcac                                          20

SEQ ID NO: 8             moltype = DNA  length = 20
FEATURE                  Location/Qualifiers
source                   1..20
                         mol_type = other DNA
                         organism = synthetic construct
SEQUENCE: 8
ccggtgaact gatactgcag                                          20

SEQ ID NO: 9             moltype = DNA  length = 20
FEATURE                  Location/Qualifiers
source                   1..20
                         mol_type = genomic DNA
                         organism = Lingulodinium polyedrum
SEQUENCE: 9
ccgtgcaatg tagtcatcgc                                          20

SEQ ID NO: 10            moltype = DNA  length = 20
FEATURE                  Location/Qualifiers
source                   1..20
                         mol_type = other DNA
                         organism = synthetic construct
SEQUENCE: 10
cggtgctatg tggtcatcac                                          20

SEQ ID NO: 11            moltype = DNA  length = 20
FEATURE                  Location/Qualifiers
source                   1..20
                         mol_type = genomic DNA
                         organism = Lingulodinium polyedrum
SEQUENCE: 11
cggttgtgcc ttgcaaacag                                          20

SEQ ID NO: 12            moltype = DNA  length = 20
FEATURE                  Location/Qualifiers
source                   1..20
                         mol_type = other DNA
                         organism = synthetic construct
SEQUENCE: 12
cggctgtgct ttggaagcag                                          20

SEQ ID NO: 13            moltype = DNA  length = 20
FEATURE                  Location/Qualifiers
source                   1..20
                         mol_type = genomic DNA
                         organism = Lingulodinium polyedrum
SEQUENCE: 13
cctcgtactt gatgcgcccg                                          20

SEQ ID NO: 14            moltype = DNA  length = 20
FEATURE                  Location/Qualifiers
source                   1..20
                         mol_type = genomic DNA
                         organism = Lingulodinium polyedrum
SEQUENCE: 14
cccttgaacg catcctcatc                                          20

SEQ ID NO: 15            moltype = DNA  length = 20
FEATURE                  Location/Qualifiers
```

-continued

```
source                1..20
                      mol_type = genomic DNA
                      organism = Lingulodinium polyedrum
SEQUENCE: 15
ctgcttacaa tttaacttta                                       20

SEQ ID NO: 16         moltype = DNA  length = 20
FEATURE               Location/Qualifiers
source                1..20
                      mol_type = genomic DNA
                      organism = Lingulodinium polyedrum
SEQUENCE: 16
cctccatccg gttcgtcttg                                       20

SEQ ID NO: 17         moltype = DNA  length = 20
FEATURE               Location/Qualifiers
source                1..20
                      mol_type = genomic DNA
                      organism = Lingulodinium polyedrum
SEQUENCE: 17
ccggtccccc actgctcgcc                                       20
```

METHOD OF CONTROLLING BIOLUMINESCENCE IN RED TIDE ALGAE

CROSS REFERENCE TO RELATED APPLICATIONS

This application is a nonprovisional of and claims priority to U.S. Provisional Patent Application Ser. No. 63/487,485, entitled "Living Light: A Complete GPCR Calcium Signaling Pathway Controls Bioluminescence in a Red Tide Algae", filed Feb. 28, 2023, the contents of which are hereby incorporated by reference into this disclosure.

GOVERNMENT SUPPORT STATEMENT

This invention was made with Government support under Grant No. 1R21ES035378-01 awarded by the National Institutes of Health. The Government has certain rights in the invention.

SEQUENCE LISTING

The sequence listing entitled "Method of Controlling Bioluminescence in Red Tide Algae" in XML format, created on Feb. 27, 2024 and being 16,000 bytes in size, is hereby incorporated by reference into this disclosure.

FIELD OF INVENTION

This invention relates to controlling harmful algae blooms. Specifically, the invention provides a novel method of inhibiting bioluminescence by targeting the BIR1-mediated pathway to control harmful algae blooms.

BACKGROUND OF THE INVENTION

G Protein-Coupled Receptors (GPCRs) are transmembrane proteins that initiate signaling pathways in response to a variety of stimuli, including sight, taste, and neurotransmitter action. GPCRs are targeted by over 35% of FDA-approved drugs but make up ~1% of protein structures in the Protein Database (PDB) 1. GPCRs are sorted into classes based on their binding modalities and structure differences, but all GPCRs have a conserved seven-transmembrane helix motif and are associated with a heterotrimeric Guanine Nucleotide Binding protein complex: the G Proteins which comprise alpha, beta, and gamma subunits, each with different subtypes. The G Protein alpha (Gα) subunit is a Guanosine Triphosphate (GTP)-hydrolase with multiple isoforms, and each isoform interacts with a different set of effectors and downstream pathways; the sequence and structure of a GPCR's intracellular loops determine which Gα isoform binds to it. The β and γ subunits also contribute to signaling for several GPCR pathways, including GRK2/3 receptor desensitization and PI3K/Akt cell cycle signaling[2, 3].

Dinoflagellates are a group of single-celled algae, which join diatoms and other microalgae as the dominant primary producers in the ocean, mostly living in warmer coastal regions. Dinoflagellates fill multiple marine niches. For example, zooxanthellae dinoflagellates, mostly in the *Symbiodinium* genus, act as endosymbionts for coral to provide nutrients. The expulsion of these algae from coral cells is known as coral bleaching. Other dinoflagellates are free-living algae which, given optimal amounts of nutrients, light, and temperature, form blooms known as red tides. Some of these blooms can become harmful, either by reducing the available oxygen in the water or by producing toxins that accumulate in predators[4, 5]. Toxic red tide blooms are common in coastal waters, especially in the Gulf of Mexico. Dinoflagellates make up ~78% of toxic microalgae species[6]. The toxins produced by these algae to ward off predators and outcompete other species can harm coastal human populations and poison shellfish in the region, mostly by means of bioaccumulation (though some toxins are aerosolized and cause respiratory irritation)[7].

*Lingulodinium polyedra* (*L. polyedra*) is a free-living dinoflagellate in the order Gonyaulacales. *L. polyedra* has a plated cell wall and two flagella, following the "core" dinoflagellate morphology. *L. polyedra* is estimated to have a genome around 200 Gigabases long which is about 60 times the size of the human genome[8]. These massive and complicated genomes, along with unique cell wall structures and culture requirements, make dinoflagellates difficult organisms to research without genetic background, including genomic sequence. *L. polyedra* commonly blooms along the Pacific coastline of North America but has a global distribution. It has been used as a model for studies in dinoflagellates, where it acts as a representative of classical dinoflagellate behavior. It has also been included in the Marine Microbial Eukaryote Transcriptome Sequencing Project (MMETSP), which is the source of transcriptomic data used by many projects in this field.

To protect themselves from copepod predation, many dinoflagellates are bioluminescent, i.e., producing light using enzymatic oxidation. When fireflies, bioluminescent bacteria, and other light-producing organisms "turn on" bioluminescence, they add oxygen to the environment around the luciferin[9]. Dinoflagellates use a different mechanism ion in which when the cell is squeezed, from waves or from the feeding currents of copepods, they transmit a signal from the cell surface to specialized vesicles called scintillons which activates the bioluminescent reaction. The mechanism of initial stimulus for this system has not been elucidated yet, but studies have implicated GPCRs using Gα inhibition and transcriptomic mining[10,11]. No study has identified a GPCR directly linked to dinoflagellate bioluminescence, which could be targeted for drug-induced suppression of bioluminescence for upregulating predation in an integrated red tide management approach.

What is needed is a method of controlling harmful algae blooms, such as red tide, which is capable of targeting specific harmful algae species without cross-reactivity on coral symbionts or other harmless algae.

SUMMARY OF INVENTION

G Protein-Coupled Receptors (GPCRs) are ubiquitous transmembrane proteins in multicellular life. Human vision, taste, and neuron activity are all mediated by GPCRs, and a large percentage of currently approved drugs target GPCRs. However, current understanding of GPCRs in single-celled eukaryotes is incomplete, and many of the components of GPCR signal transduction have not been identified in unicellular eukaryotes. Previous works studying bioluminescent dinoflagellates, single-celled algae involved in coral reef endosymbiosis and toxic red tide blooms, implicate GPCRs in a signaling pathway for bioluminescence but have not elucidated the components of the pathway. Herein, the inventors identified a novel GPCR in dinoflagellates, bioluminescence-inducing receptor (BIR1), which plays a significant role in the signaling pathway for bioluminescence in red tide blooms. The endogenous G-Protein complex for BIR1 signaling was also identified, as well as a full complement of downstream pathway members. BIR1 opens doors for integrated red tide control and novel GPCR reporter systems.

A method of preventing formation of harmful algae blooms (HAB) is presented comprising: applying an effective amount of a G protein-coupled receptor (GPCR) inhibitor to algae capable of forming harmful algae blooms to reduce bioluminescence of the algae to prevent the formation of the algae blooms. The reduction of the bioluminescence in the algae increases copepod predation of the algae which prevents formation of dinoflagellate algae blooms.

The algae may be a dinoflagellate algae selected from the group consisting of *Lingulodinium polyedra* (*L. polyedra*), *Pyrodinium bahamense* (*P. bahamense*), *Gonyaulax spinifera* (*G. spinifera*), *Protoceratium reticulatum* (*P. reticulatum*), *Alexandrium tamarense* (*A. tamarense*), *Alexandrium catenella* (*A. catenella*), *Alexandrium affine* (*A. affine*), and *Alexandrium monilatum* (*A. monilatum*). In some embodiments, the dinoflagellate algae is *Lingulodinium polyedra* (*L. polyedra*).

The GPCR may be bioluminescence-inducing receptor (BIR1) in which case the GPCR inhibitor is a BIR1 inhibitor. The GPCR inhibitor may be applied directly to the algae or may be applied to aquatic environment inhabited by the algae or potentially inhabited by the algae.

In another embodiment, a method of reducing bioluminescence in dinoflagellate algae is presented comprising: applying an effective amount of a G protein-coupled receptor (GPCR) inhibitor to algae capable of forming harmful algae blooms to reduce bioluminescence of the algae. The reduction of the bioluminescence in the algae increases copepod predation of the algae which prevents formation of dinoflagellate algae blooms.

The algae may be a dinoflagellate algae selected from the group consisting of *Lingulodinium polyedra* (*L. polyedra*), *Pyrodinium bahamense* (*P. bahamense*), *Gonyaulax spinifera* (*G. spinifera*), *Protoceratium reticulatum* (*P. reticulatum*), *Alexandrium tamarense* (*A. tamarense*), *Alexandrium catenella* (*A. catenella*), *Alexandrium affine* (*A. affine*), and *Alexandrium monilatum* (*A. monilatum*). In some embodiments, the dinoflagellate algae is *Lingulodinium polyedra* (*L. polyedra*).

The GPCR may be bioluminescence-inducing receptor (BIR1) in which case the GPCR inhibitor is a BIR1 inhibitor. The GPCR inhibitor may be applied directly to the dinoflagellate algae or may be applied to aquatic environment inhabited by the dinoflagellate algae or potentially inhabited by the dinoflagellate algae.

In a further embodiment, a method of controlling harmful algae or harmful algae blooms (HAB) comprising: treating algae capable of forming the harmful algae blooms with an effective amount of a bioluminescence-inducing receptor (BIR1) inhibitor wherein the BIR1 inhibitor reduces bioluminescence of the algae to prevent the formation of the harmful algae blooms. The reduction of the bioluminescence in the algae increases copepod predation of the algae which prevents formation of algae blooms.

The algae may be a dinoflagellate algae selected from the group consisting of *Lingulodinium polyedra* (*L. polyedra*), *Pyrodinium bahamense* (*P. bahamense*), *Gonyaulax spinifera* (*G. spinifera*), *Protoceratium reticulatum* (*P. reticulatum*), *Alexandrium tamarense* (*A. tamarense*), *Alexandrium catenella* (*A. catenella*), *Alexandrium affine* (*A. affine*), and *Alexandrium monilatum* (*A. monilatum*). In some embodiments, the dinoflagellate algae is *Lingulodinium polyedra* (*L. polyedra*).

The BIR1 inhibitor may be applied directly to the algae or may be applied to aquatic environment inhabited by the algae or potentially inhabited by the algae.

BRIEF DESCRIPTION OF THE DRAWINGS

For a fuller understanding of the invention, reference should be made to the following detailed description, taken in connection with the accompanying drawings, in which:

FIG. 2 is a table of selected candidates from transcriptome screening.

FIG. 3A-D are a series of images depicting Matchmaker alignments of with 60Y9. (A) BIR1: Gαβγ; (B) GPCR alignment; (C) Gα alignment; (D) GB alignment.

FIG. 4A-F are a series of images depicting (A,B) Alexa-488-labeled oligonucleotide uptake. (C,D,E,F) Time-course bioluminescent kinetics of antisense knockdown. Peak 1 (red line) and Peak 2 (black X) are compared to the non-transfected control (dashed line/X).

FIG. 5A-D are a series of images depicting moving average curves of (A) L300 dose response; (B) PEI dose response; (C) BIR1 knockdown; and (D) Gα knockdown.

FIG. 6A-B are a series of graphs depicting time-course bioluminescent kinetics of BIR1 knockout via ribonucleoprotein transfection. (A) first night cycle (16 hours); and (B) full 48 hour cycle.

FIG. 8 is a table of antisense oligonucleotides for selected candidates.

DETAILED DESCRIPTION OF THE PREFERRED EMBODIMENT

Figure 1:
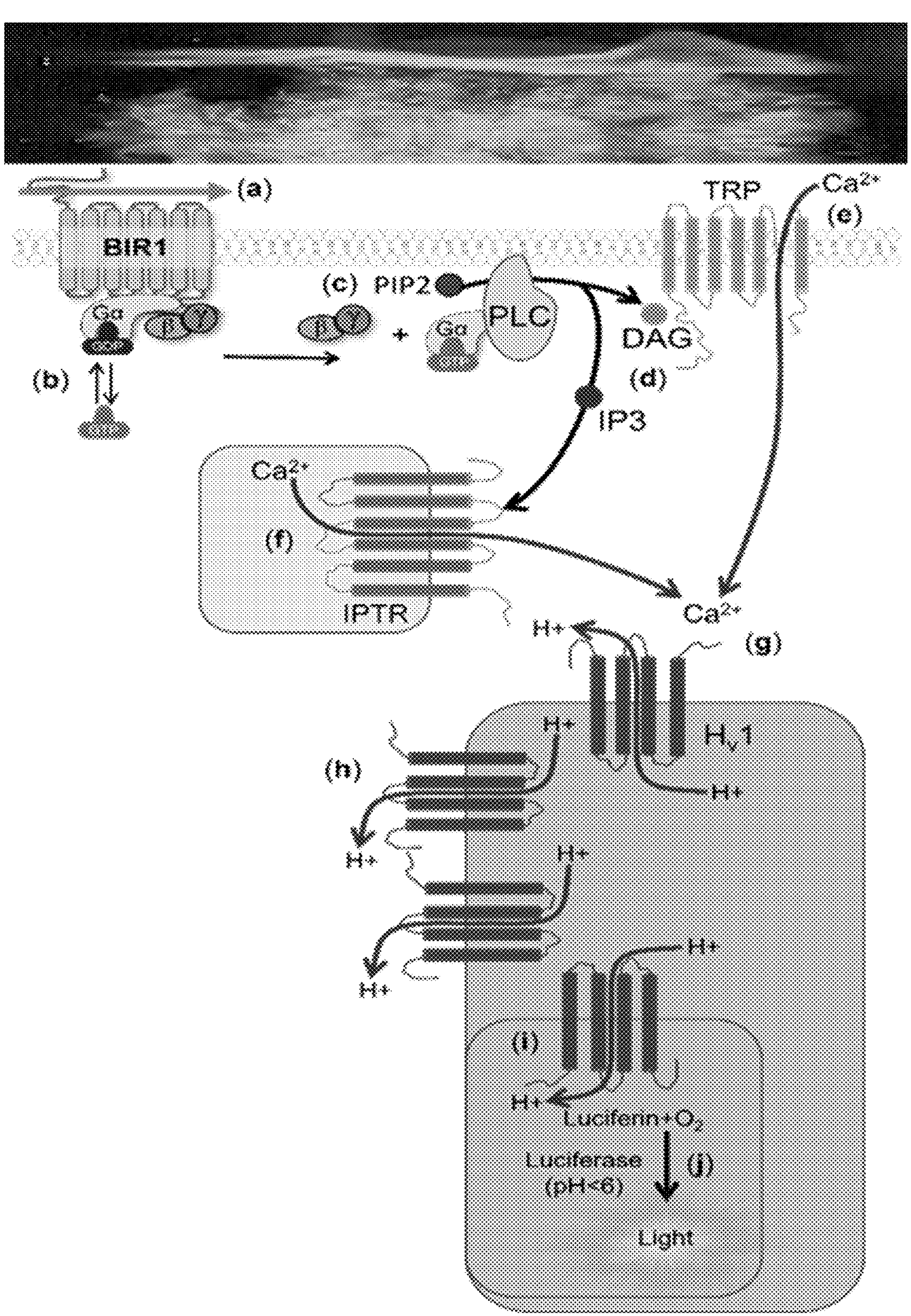
FIG. 1 is an image depicting the inferred bioluminescence pathway in *L. polyedra*.

In the following detailed description of the preferred embodiments, reference is made to the accompanying drawings, which form a part hereof, and within which are shown by way of illustration specific embodiments by which the invention may be practiced. It is to be understood that other embodiments may be utilized, and structural changes may be made without departing from the scope of the invention.

Definitions

Unless otherwise defined, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are described herein. All publications mentioned herein are incorporated herein by reference in their entirety to disclose and describe the methods and/or materials in connection with which the publications are cited. It is understood that the present disclosure supersedes any disclosure of an incorporated publication to the extent there is a contradiction.

As used herein, the singular forms "a," "an" and "the" include plural referents unless the context clearly dictates otherwise.

As used in this specification and the appended claims, the term "or" is generally employed in its sense including "and/or" unless the context clearly dictates otherwise.

All numerical designations, such as pH, temperature, time, concentration, and molecular weight, including ranges, are approximations which are varied up or down by increments of 1.0, 0.1, 0.01 or 0.001 as appropriate. It is to be understood, even if it is not always explicitly stated that all numerical designations are preceded by the term "about". It is also to be understood, even if it is not always explicitly stated, that the reagents described herein are merely exemplary and that equivalents of such are known in the art and can be substituted for the reagents explicitly stated herein.

Concentrations, amounts, solubilities, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include the individual values and sub-ranges within the indicated range. Thus, included in this numerical range are individual values such as 2, 3, and 4 and sub-ranges such as from 1-3, from 2-4 and from 3-5, etc. This same principle applies to ranges reciting only one numerical value. Furthermore, such an interpretation should apply regardless of the range or the characteristics being described.

As used herein, the term "comprising" is intended to mean that the products, compositions, and methods include the referenced components or steps, but not excluding others. "Consisting essentially of" when used to define products, compositions, and methods, shall mean excluding other components or steps of any essential significance that affect the novel characteristics of the invention as described herein. Thus, a composition consisting essentially of the recited components would not exclude trace contaminants and pharmaceutically acceptable carriers. "Consisting of" shall mean excluding more than trace elements of other components or steps.

As used herein, "about" means approximately or nearly and in the context of a numerical value or range set forth means ±10% of the numerical.

"Effective amount" as used herein refers to concentrations or amounts of components which are sufficient to effect beneficial or desired results including, but not limited to, preventing formation of harmful algae blooms, inhibiting or reducing growth of harmful algae blooms, and reducing the spread of harmful algae. The dose and frequency of treatment is dependent on the amount of aquatic environment and algae to be treated.

"BIR1 inhibitor" as used herein refers to any active agent that is capable of inhibiting bioluminescence through interactions with BIR1 in eukaryotic organisms. The active agent could be an inverse agonist, antagonist, partial agonist, or full agonist of BIR1.

"Active agent" as used herein refers to an agent or substance having inhibitory activity in an algae, particularly a harmful algae, when applied to the algae itself or to an environment which the algae inhabits or potentially inhabits. The active agent may be natural or synthetically derived.

"Red tide" as used herein refers to harmful algae blooms in bodies of water (freshwater, seawater, brackish water) in which plankton, including microscopic algae, multiply to higher than normal concentrations. The plankton may include the classes of dinoflagellates, cyanobacteria, haptophytes, raphidciphytes, and diatoms as well as any other plankton comprising a toxic compound of interest. In some embodiments, the plankton responsible for red tide may be algae such as dinoflagellates. Dinoflagellates may include, but are not limited to, those of genus *Karlodinium, Gyrodinium, Pfiesteria, Alexandrium, Cochlodinium, Dinophysis, Karenia* and *Prorocentrum*. Exemplary dinoflagellates include, but are not limited to, *Lingulodinium polyedra* (*L. polyedra*), *Pyrodinium bahamense* (*P. bahamense*), *Gonyaulax spinifera* (*G. spinifera*), *Protoceratium reticulatum* (*P. reticulatum*), *Alexandrium tamarense* (*A. tamarense*), *Alexandrium catenella* (*A. catenella*), *Alexandrium affine* (*A. affine*), and *Alexandrium monilatum* (*A. monilatum*). "Harmful algae blooms" or "HAB" are used synonymously with "red tide" herein.

"Controlling red tide" or "controlling harmful algae or harmful algae bloom" as used herein refers to preventing formation of algae blooms, inhibiting or reducing growth of algae causing algae blooms, reducing the spread of algae causing algae blooms, and/or increasing predation of algae.

"Aquatic environment" as used herein refers to the liquid environment in which plankton, such as algae, in particular harmful algae, inhabit or potentially inhabit. In some embodiments, the aquatic environment is water such as seawater, freshwater, and brackish water.

"Applying" as used herein refers to the method with which the compositions of the instant invention are delivered to the algae or aquatic environment. Depending on the particular form of composition used, applying includes, but is not limited to, mixing, spraying, diluting, doping, dusting, manual feeding, sprinkling, and manual broadcasting.

Harmful algal blooms (HABs) cause strongly negative impacts on coastal oceans, lakes, rivers, and municipal thinking supplies world-wide. These can be seen, for example, either directly though production and release of potent neurotoxins and/or through massive die-offs that induce anoxic conditions and extensive fish-kills. Contamination of shellfish with toxins produced by HABs continues to be an ongoing concern for the fisheries, aquaculture industry, and research fields as the HABs cause ocean closures, sale bans, and consumption restrictions. Not only are HABs harmful for human consumers, but the toxic blooms are often devastating to the ecosystem and to a large variety of marine organisms. HABs can have a direct, potentially fatal, effect on humans.

GPCRs are important signaling proteins in multicellular eukaryotes but are under-represented in unicellular organisms. Existing proteomes of many unicellular eukaryotes lack some of the components of canonical GPCR signaling. The inventors have identified a G Protein-Coupled Receptor pathway in *Lingulodinium polyedra* using bioinformatics, structure prediction, knockdowns, and knockouts. The GPCR (bioluminescence-inducing receptor, BIR1) triggers a flash of light to ward off predators. The BIR1-mediated pathway can be targeted to reduce the threat of red tides and forms the basis of a novel GPCR reporter system that can expand the field of GPCR research.

The following non-limiting examples illustrate exemplary systems and components thereof in accordance with various embodiments of the disclosure. The examples are merely illustrative and are not intended to limit the disclosure in any way.

Example 1—Identification of BIR1

The inventors have shown the presence of a GPCR-mediated signaling pathway controlling bioluminescence in *Lingulodinium polyedra* (*L. polyedra*). By identifying a Gγ subunit candidate and multiple IP3R/IP3R-like candidates, the pathway model (FIG. 1) demonstrates a more complete GPCR signaling pathway than was previously assumed in unicellular eukaryotes[13]. The inventors also illustrate the viability of genetic manipulation in dinoflagellates, despite complications in genome size, CRISPR expression, and methodology.

BIR1 may be used as a target for red tide control through the administration of compounds that target BIR1, or potential homologs in other species, by reducing bioluminescence in red tide blooms and upregulating predation of dinoflagellates by copepods. This method of integrated red tide management can target specific dinoflagellate species, with no cross-activity on coral symbionts or other harmless algae. Water-doping circumvents off-target damage caused by clay flocculation or chemical treatment and prevents cyst formation that compounds the intensity of subsequent blooms.

BIR1 and its pathway also open the door to new drug design methodologies. BIR1-knockout strains of *L. polyedra*, generated using RNP lipofection, are transfected with a GPCR of interest and modified to interact with the endogenous G Protein to study ligand activity. Ligands that activate this introduced GPCR trigger bioluminescence, which can then be measured and compared to acid induction, which bypasses the GPCR mechanism, or shear induction of negative control strains. Having an endogenous bioluminescent reporter system eliminates the need for luciferins and limits the effects of protein degradation on results. Dinoflagellates are also relatively inexpensive to culture, making dinoflagellate GPCR reporters an inexpensive, effective way to screen ligands for GPCRs of many kinds, including drug targets for human medicine and orphaned GPCRs.

Targeting BIR1 may revolutionize how red tides are managed, and BIR1-knockouts represent a new avenue for functional GPCR studies. Future studies into the structure of BIR1 and its interactions with ligands provides insight into the development and diversity of GPCR systems in unicellular eukaryotes.

Results

Transcript Mining of *L. polyedra* Reveals GPCR and Effector Candidates

The whole transcriptome of *Lingulodinium polyedra* strain CCMP 1936 (Accession: GABP00000000.1) was analyzed in eggNOG (evolutionary genealogy of genes: Non-Orthologous Grouping), which categorized gene fragments predicted from the whole transcriptome into gene ontology groups. 11 sequences were identified as GPCRs using an E-Value cut-off of 0.001, selected to mimic the cut-off of other transcriptome experiments in dinoflagellates. A Phospholipase-C (PLC) candidate was also identified from the eggNOG data, with an e-value of 1E-11. To confirm homology of the GPCR and PLC candidates, the top five sequences were put into blastx, a form of Basic Local Alignment Search Tool that aligns possible reading frames of nucleotide sequences with the nonredundant protein database. The best candidates are shown in FIG. 2.

Candidate sequences for G Protein complex subunits, as well as PLC and Inositol 1,4,5-Trisphosphate Receptor (IP3R), were identified using tBLASTn, which searched the Transcriptome Shotgun Assembly of *L. polyedra* using a protein query. The top sequences were queried in blastx to confirm sequence homology. The G-Protein gamma subunit is very small, and the lowest tBLASTn e-value was 8.1. That sequence was run through Conserved Domain Search, which identified a G-gamma-like domain. (FIG. 2)

Structure Prediction and Alignment

Structure prediction was performed based on amino-acid sequences extracted from BLAST alignment reading frames in the Colab Notebook distribution of Alphafold2. The top GPCR candidate was modeled both on its own in monomer mode and with the three G-Protein subunits in multimer mode. (FIG. 3A) Alphafold consistently modeled the candidate with 7 transmembrane helices, a defining motif in GPCRs. The G protein complex members associate along the intracellular loops as expected, while the long, random chain C-terminus does not associate with the G Protein complex and is likely a nonstop sequencing error in the transcriptome. FIG. 3B-D show the alignments of the dinoflagellate GPCR, Gα, and Gβ with corresponding structures from a complete Rhodopsin: $G\alpha_T\beta\gamma$ complex (PDB: 60Y912) executed by ChimeraX Matchmaker. Pruned RMSD for all alignment pairs was <1.22 Ångström, showing strong structural similarity between homologous structures. The alignment between the receptor candidate and rhodopsin agrees with sequence alignments, which grouped the receptor with Class A, rhodopsin-like GPCRs. The alignments for Gα and Gβ demonstrate that the sequences retrieved from the *L. polyedra* transcriptome are significantly truncated when compared to conventional structures, which is in agreement with the areas of alignment in blastx and demonstrates the imperfect nature of transcriptome reads.

Antisense-Mediated Knockdowns

When measuring bioluminescence in the dark over 48 hours, two regions of bioluminescent activity develop corresponding to two "night cycles", with a period of relative inactivity between them representing a circadian rhythm-controlled "day cycle" as shown in FIG. 4. The two, night cycle activity peaks were compared between different antisense DNA oligonucleotides. The 20-nucleotide oligomers included a "scramble" sequence with no transcriptome identities as a negative control and oligos targeting known bioluminescence-relevant genes (namely Luciferase and Phospholipase C) to act as positive controls. Lipofectamine 3000 was selected as the lipofection agent and was compared to polyethyleneimine (PEI) to determine dosage and efficacy (FIG. 5A-B). As shown in FIG. 4C-D, lipofection of *L. polyedra* with Phospholipase C-targeting oligonucleotides reduced bioluminescence during the first night phase compared to scrambled DNA (Peak 1). As the nucleotides were degraded or used up, the second night cycle produced higher signal with a broader peak (Peak 2). Preliminary knockdown targeting 5 of the top GPCR candidates, as well as 4-nucleotide-mismatch controls, showed some reducing effect for Receptor Candidate 3 (RC3) and Receptor Candidate 5 (RC5). The data presented in FIG. 4E-F confirmed the effect that RC3 knockdowns mimic the positive controls Luciferase and Phospholipase C. Further trials of this data set confirmed the relationship between RC3 knockdown and bioluminescence activity (FIG. 5C), and therefore RC3 has been renamed Bioluminescence-Inducing Receptor 1 (BIR1). Knockdowns of candidate G-alpha subunits also displayed reducing activity in two candidate sequences. (FIG. 5D)

Ribonucleoprotein Knockouts

In knockout experiments, Cas9-GFP complexed with sgRNA targeting BIR1 were delivered to cells via Lipofectamine 3000 (preliminary tests using plasmids showed high cell toxicity, not shown). FIG. 6 includes two experimental trials, showing the first night cycle and the full 48 hours. The 16-hour dataset (FIG. 6*a*) shows reduction during the night phase, and the 48-hour dataset, unlike the knockdown trials, shows reduced bioluminescence in the second night phase and demonstrates stable reduction of bioluminescence (FIG. 6*b*) RNP without lipofectamine still contributes to bioluminescence reduction, suggesting a role for endocytosis-mediated transfection.

Materials and Methods

Materials and Reagents

*Lingulodinium polyedra* strain CCMP1936, L1 Culture Media Kits, and Gulf of Maine Filtered Seawater were obtained from the National Center for Marine Algae and Microbiota at Bigelow Laboratory. Lipofectamine 3000 was obtained from Thermo Fisher. Antisense Oligonucleotides were made by Eurofins Genomics. Cas9-GFP and sgRNA were made by IDT.

Transcriptome Mining

Figure 7:
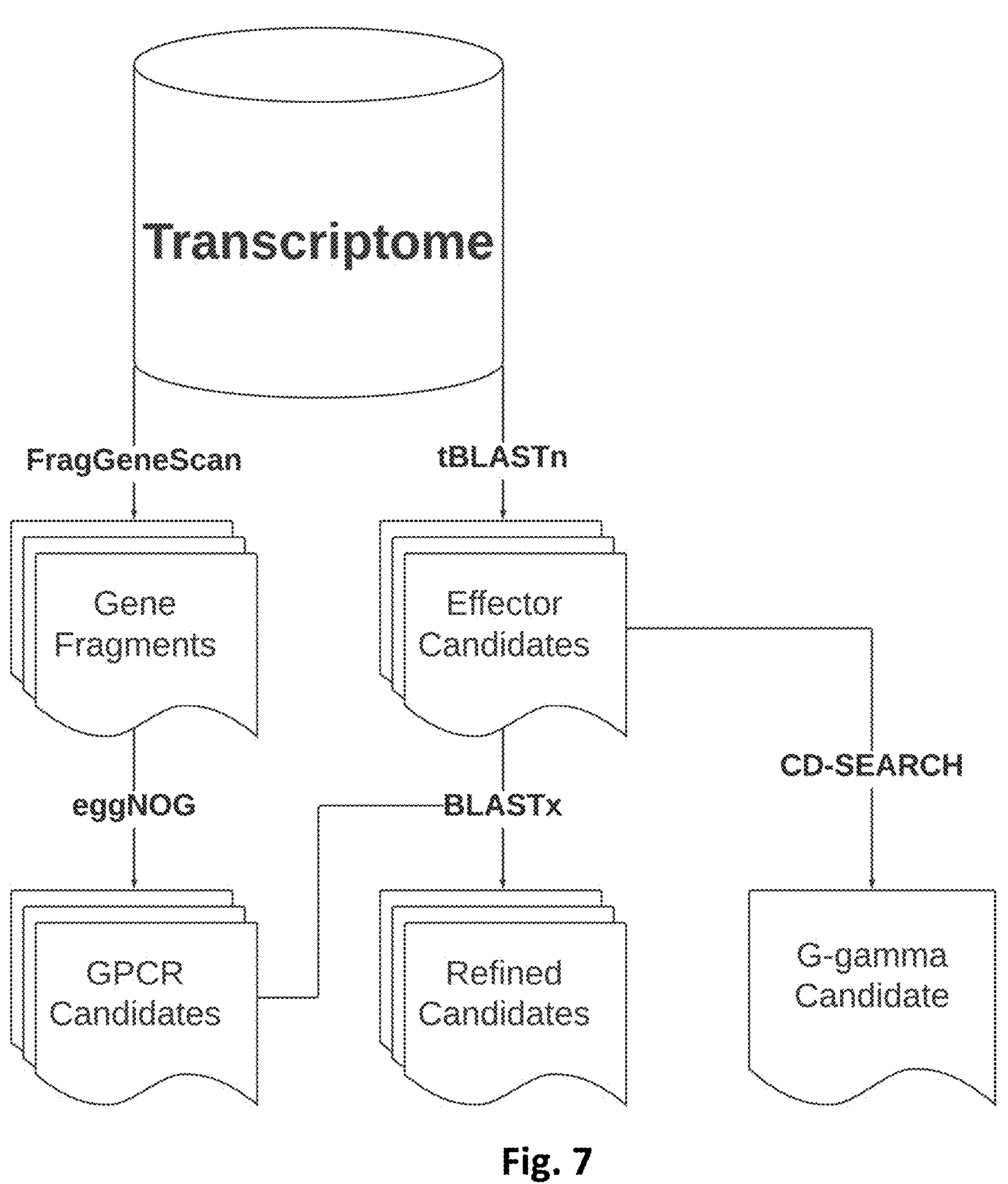
FIG. 7 is an image depicting bioinformatic workflow for transcriptome mining.

The transcriptome mining procedure is visualized in FIG. 7. The transcriptome shotgun assembly (TSA) of *L. polyedra* strain CCMP1936 was obtained from GenBank (Transcriptome Accession: GABP00000000.114). The whole transcriptome was input into FragGeneScan, and then eggNOG was applied to categorize predicted fragments into Gene Ontology groups[15,16]. The annotated genes were searched along multiple parameters—including KEGG Keys, GO codes, and descriptions provided by eggNOG—to identify candidate GPCR and effector sequences. To identify candidate sequences for other effectors, representative protein sequences from GenBank were queried against the nucleotide sequences for all TSA data for *Lingulodinium polyedra* using tBLASTn (FIG. 2). The sequences for all GPCR and effector candidates were then queried against the non-redundant protein database using blastx to identify candidates that match a different protein than the effector from tBLASTn. Due to the small size of Gγ, a high E-value cutoff was used to find candidates, which were then queried through Conserved-Domain Search to identify G-Gamma-Like Domains (pfam00631).

Structure Analysis

GPCR Candidate sequences were input into two structure prediction tools—Phyre2 and C-I-TASSER—to predict structure similarity to GPCRs[17, 18]. BIR1 was selected from the set and modeled along with the G Protein Subunit candidates in Alphafold. The predicted multimer was compared to Rhodopsin: $G\alpha_7\beta\gamma$ (PDB Code: 60Y9) using MatchMaker in ChimeraX.

Cell Culture

*L. polyedra* strain CCMP1936 was cultured in filtered Gulf of Maine seawater with L1 media supplements. A clear front refrigerated incubator set at 20° C., and an LED light was set up to provide ~140 μmol of photons/s on a 12 hour on: 12 hour off cycle (Aputure AL-F7, 0.4 m away at maximum brightness and 5600K CCT for most efficient photosynthesis, plugged into an outlet timer). Cultures were sampled frequently and counted by adding 10 μL of culture to a small capillary tube (0.58 mm ID) and counting across the capillary. Bioluminescence was also qualitatively observed to gauge cell density and health.

Antisense-Mediated Knockdown

Antisense Oligonucleotides for knockdown were designed using CHOPCHOP, a prediction software traditionally used for CRISPR/Cas9. As no dinoflagellates were in the database at the time of analysis, *Phaeodactylum tricornutum* was used as a close neighbor. Knock-out was selected as the preferred effect, and the efficiency score algorithm developed by Xu et al. 201519 was applied. The first result with no self-complementarity was run through BLAST against the transcriptome shotgun assembly of *L. polyedra* to confirm no off-target complements. One oligonucleotide was made for each of the top 5 GPCR candidate transcripts, then 4 bases in each sequence were replaced for mismatch controls (one control per sequence). A scramble oligonucleotide was also designed by randomizing a sequence while maintaining similar G/C content. Antisense oligonucleotides were also designed for Gα candidates. Finally, two positive-control ASOs were designed: one for Phospholipase-Cβ (identified from the transcriptome), and another for Luciferase (previously identified by Baker et. al.[20]). FIG. 8 shows the oligonucleotide sequence and the accession number for the corresponding transcript. The 20 nucleotide antisense oligomers based on these targets were ordered from Eurofins Genomics and rehydrated to 1 mM (1 nmol/mL) with autoclaved $dH_2O$. A second ASO for BIR was made with Alexa-488 conjugated to it, allowing for microscopic evaluation of uptake. (FIG. 4A-B)

For transfection of oligonucleotides, DNA was packaged into liposomes using the Lipofectamine 3000 Reagent Kit (Thermo Fisher) and following kit-defined protocols. 1 nmol of DNA was diluted in 125 μL of L1 media, and then mixed with 10 μL of P3000 (approximately 2 μL per μg). 5 μL of Lipofectamine 3000 was also diluted in 125 μL of L1, and then the two solutions were mixed and incubated for 15 minutes. Meanwhile, 1 mL of cells per sample (~2E4 cells/well) were centrifuged at 700×g for 5 minutes at about 2 hours before the dark cycle, and the supernatant was carefully discarded. The DNA/P3000/L3000 mix was added and mixed by pipetting up and down, and the cells were aliquoted into a white 96-well plate (CellStar). A lid (or optical film punctured to allow gas exchange) was used to cover the plate, and kinetic luminescence was read using a multimode plate reader (FLx800 or Synergy 2, both from Biotek) for 48 hours.

Cas9: sgRNA-Mediated Knockout

Cas9-GFP and BIRsgRNA (sgRNA made with the same target region as RC3 ASO) were obtained from IDT and diluted in nuclease-free water to 5.3 μM and 5 μM, respectively. These stocks were mixed for a concentration ratio of 5.3 μM: 5 μM and incubated for 20 minutes at room temperature. The RNP and diluted stocks were kept at −80° C. until needed, while undiluted stocks remained at −20° C.

The preparation and lipofection of Cas9 and RNP followed the aforementioned procedure but used 5 μL of P3000 to maintain the 2 μL/μg ratio. RNP was also diluted in L1 on its own to observe the potential for endogenous endocytosis. GFP fused to the Cas9 protein also allowed for microscopic observation of transfection.

Example 2—Prevention of Red Tide (Prophetic)

A number of dinoflagellate algae are observed in the water. The water is treated with an effective amount of a BIR1 inhibitor to reduce bioluminescence of the algae. Increased copepod predation is noted which reduces the number of algae present in the water thus preventing red tide bloom formation.

REFERENCES

1. Sriram, K. & Insel, P. A. G Protein-Coupled Receptors as Targets for Approved Drugs: How Many Targets and How Many Drugs? *Mol Pharmacol* 93, 251-258 (2018).
2. Lowe, J. D. et al. Role of G Protein-Coupled Receptor Kinases 2 and 3 in mu-Opioid Receptor Desensitization and Internalization. *Mol Pharmacol* 88, 347-356 (2015).

3. Senarath, K. et al. Regulation of G Protein betagamma Signaling. *Int Rev Cell Mol Biol* 339, 133-191 (2018).
4. Wang, D.-Z. Neurotoxins from Marine Dinoflagellates: A Brief Review. *Marine Drugs* 6, 349-371 (2008).
5. Selander, E. et al. Predator lipids induce paralytic shellfish toxins in bloom-forming algae. *Proc Natl Acad Sci USA* 112, 6395-6400 (2015).
6. Lundholm, N. et al., Vol. 2023 (IOC-UNESCO, 2023).
7. CDC (CDC, Atlanta, Georgia; 2019).
8. Hong, H. H. et al. The exceptionally large genome of the harmful red tide dinoflagellate Cochlodinium polykrikoides Margalef (Dinophyceae): determination by flow cytometry. *Algae-Seoul* 31, 373-378 (2016).
9. Tsai, Y. L. et al. Firefly light flashing: oxygen supply mechanism. *Phys Rev Lett* 113, 258103 (2014).
10. Chen, A. K., Latz, M. I., Sobolewski, P. & Frangos, J. A. Evidence for the role of G-proteins in flow stimulation of dinoflagellate bioluminescence. *Am J Physiol Regul Integr Comp Physiol* 292, R2020-2027 (2007).
11. Mojib, N. & Kubanek, J. Comparative transcriptomics supports the presence of G protein-coupled receptor-based signaling in unicellular marine eukaryotes. *Limnology and Oceanography* 65, 762-774 (2019).
12. Gao, Y. et al. Structures of the Rhodopsin-Transducin Complex: Insights into G-Protein Activation. *Mol Cell* 75, 781-790 e783 (2019).
13. de Mendoza, A., Sebe-Pedros, A. & Ruiz-Trillo, I. The evolution of the GPCR signaling system in eukaryotes: modularity, conservation, and the transition to metazoan multicellularity. *Genome Biol* Evol 6, 606-619 (2014).
14. Roy, S. & Morse, D. A full suite of histone and histone modifying genes are transcribed in the dinoflagellate *Lingulodinium. PLOS One* 7, e34340 (2012).
15. Huerta-Cepas, J. et al. eggNOG 5.0: a hierarchical, functionally and phylogenetically annotated orthology resource based on 5090 organisms and 2502 viruses. *Nucleic Acids Res* 47, D309-D314 (2019).
16. Rho, M., Tang, H. & Ye, Y. FragGeneScan: predicting genes in short and error-prone reads. *Nucleic Acids Res* 38, e191 (2010).
17. Kelley, L. A., Mezulis, S., Yates, C. M., Wass, M. N. & Sternberg, M. J. The Phyre2 web portal for protein modeling, prediction and analysis. *Nat Protoc* 10, 845-858 (2015).
18. Zheng, W. et al. Folding non-homologous proteins by coupling deep-learning contact maps with I-TASSER assembly simulations. *Cell Rep Methods* 1 (2021).
19. Xu, H. et al. Sequence determinants of improved CRISPR sgRNA design. *Genome Res* 25, 1147-1157 (2015).
20. Baker, A., Robbins, I., Moline, M. A. & Iglesias-Rodriguez, M. D. Oligonucleotide Primers for the Detection of Bioluminescent Dinoflagellates Reveal Novel Luciferase Sequences and Information on the Molecular Evolution of This Gene (1). *J Phycol* 44, 419-428 (2008).

The disclosures of all publications cited above are expressly incorporated herein by reference, each in its entirety, to the same extent as if each were incorporated by reference individually.

It is also to be understood that the following claims are intended to cover all of the generic and specific features of the invention herein described, and all statements of the scope of the invention which, as a matter of language, might be said to fall there between. Now that the invention has been described,

What is claimed is:

1. A method of preventing formation of harmful algae blooms comprising:

applying an effective amount of a G protein-coupled receptor (GPCR) inhibitor to algae capable of forming harmful algae blooms to reduce bioluminescence of the algae to prevent the formation of the algae blooms, wherein the GPCR inhibitor comprises an antisense oligonucleotide having SEQ ID NO: 7 targeting bioluminescence-inducing receptor (BIR1).

2. The method of claim 1, wherein the algae is a dinoflagellate algae selected from the group consisting of *Lingulodinium polyedra* (*L. polyedra*), *Pyrodinium bahamense* (*P. bahamense*), *Gonyaulax spinifera* (*G. spinifera*), *Protoceratium reticulatum* (*P. reticulatum*), *Alexandrium tamarense* (*A. tamarense*), *Alexandrium catenella* (*A. catenella*), *Alexandrium affine* (*A. affine*), and *Alexandrium monilatum* (*A. monilatum*).

3. The method of claim 2, wherein the dinoflagellate algae is *Lingulodinium polyedra* (*L. polyedra*).

4. The method of claim 1, wherein the antisense oligonucleotide is packaged in a liposome to facilitate uptake of the antisense oligonucleotide by the algae.

5. The method of claim 1, wherein the reduction of the bioluminescence in the algae increases copepod predation of the algae to prevent the formation of the harmful algae blooms.

6. The method of claim 1, wherein the GPCR inhibitor is applied directly to the algae.

7. The method of claim 1, wherein the GPCR inhibitor is applied to an aquatic environment inhabited by the algae or potentially inhabited by the algae.

8. A method of reducing bioluminescence in dinoflagellate algae comprising:

applying an effective amount of a G protein-coupled receptor (GPCR) inhibitor to algae capable of forming harmful algae blooms to reduce bioluminescence of the algae;

wherein the GPCR inhibitor comprises an antisense oligonucleotide having SEQ ID NO: 7 targeting bioluminescence-inducing receptor (BIR1).

9. The method of claim 8, wherein the algae is a dinoflagellate algae selected from the group consisting of *Lingulodinium polyedra* (*L. polyedra*), *Pyrodinium bahamense* (*P. bahamense*), *Gonyaulax spinifera* (*G. spinifera*), *Protoceratium reticulatum* (*P. reticulatum*), *Alexandrium tamarense* (*A. tamarense*), *Alexandrium catenella* (*A. catenella*), *Alexandrium affine* (*A. affine*), and *Alexandrium monilatum* (*A. monilatum*).

10. The method of claim 9, wherein the dinoflagellate algae is *Lingulodinium polyedra* (*L. polyedra*).

11. The method of claim 8, wherein the antisense oligonucleotide is packaged into a liposome to facilitate uptake of the antisense oligonucleotide by the algae.

12. The method of claim 8, wherein the reduction of the bioluminescence in the dinoflagellate algae increases copepod predation of the dinoflagellate algae.

13. The method of claim 12, wherein the increased copepod predation prevents formation of dinoflagellate algae blooms.

14. The method of claim 8, wherein the GPCR inhibitor is applied directly to the algae or is applied to aquatic environment inhabited by the algae or potentially inhabited by the algae.

15. A method of controlling harmful algae or harmful algae blooms (HAB) comprising:

treating algae capable of forming the harmful algae blooms with an effective amount of an antisense oligonucleotide having SEO ID NO: 7;

wherein the antisense oligonucleotide inhibits expression of bioluminescence inducing receptor (BIR1) which reduces bioluminescence of the algae to prevent the formation of the harmful algae blooms.

16. The method of claim 15, wherein the algae is a dinoflagellate algae selected from the group consisting of *Lingulodinium polyedra* (*L. polyedra*), *Pyrodinium bahamense* (*P. bahamense*), *Gonyaulax spinifera* (*G. spinifera*), *Protoceratium reticulatum* (*P. reticulatum*), *Alexandrium tamarense* (*A. tamarense*), *Alexandrium catenella* (*A. catenella*), *Alexandrium affine* (*A. affine*), and *Alexandrium monilatum* (*A. monilatum*).

17. The method of claim 16, wherein the dinoflagellate algae is *Lingulodinium polyedra* (*L. polyedra*).

18. The method of claim 15, wherein the reduction of the bioluminescence in the algae increases copepod predation of the algae.

19. The method of claim 18, wherein the increased copepod predation prevents formation of algae blooms.

20. The method of claim 15, wherein the BIR1 inhibitor is applied directly to the algae or is applied to aquatic environment inhabited by the algae or potentially inhabited by the algae.

* * * * *